United States Patent [19]
Barron

[11] 3,883,722
[45] May 13, 1975

[54] ACTIVE AND PASSIVE SONAR RANGE COMPUTER

[76] Inventor: Daniel Barron, 15023 Kalmia Dr., Laurel, Md. 20810

[22] Filed: June 21, 1973

[21] Appl. No.: 371,422

[52] U.S. Cl............................ 235/61 B; 235/61 GM
[51] Int. Cl............................................................ G06
[58] Field of Search............ 235/61 B, 61 GM, 89 R

[56] References Cited
UNITED STATES PATENTS

| | | | |
|---|---|---|---|
| 3,184,161 | 5/1965 | Schwarz et al..................... | 235/89 R |
| 3,266,721 | 8/1966 | Barron............................... | 235/89 R |
| 3,514,582 | 5/1970 | Sanderson......................... | 235/89 R |

*Primary Examiner*—Samuel Feinberg
*Attorney, Agent, or Firm*—R. S. Sciascia; Arthur L. Branning; Melvin L. Crane

[57] ABSTRACT

A hand operated active and passive sonar range computer that relates various parameters depending on obtained oceanic values either actual or from charts in order to simply determine range.

3 Claims, 6 Drawing Figures

ABE AND PASSIVE SONAR RANGE COMPUTER

ACTIVE AND PASSIVE SONAR RANGE COMPUTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to hand operated computers and more particularly to a hand operated computer for determining the passive or active sonar range for a particular sonar used. This sonar device may be useful in helicopter aircraft and shipboard hull and variable depth sonar both active and passive.

Heretofore, sonar range has been determined by various types of sonar equipment using complicated expensive equipment in which various information obtained from sonar tables etc. have been fed. More recently, hand operated computers have been devised for range computation using information on different parameters of the sea. Some of these are contained in the following U.S. Pat. Nos., 3,518,894; 3,625,419; 3,675,352; and 3,681,573.

SUMMARY OF THE INVENTION

This invention is directed to a simple hand operated device which determines the passive and active sonar range of a particular sonar within the waters of a particular area in the world. This invention makes use of the actual data obtained relative to the different sea parameters or it may make use of a series of charts, propagation loss curves corresponding to a particular area of the sea, ambient noise tables, average reverberation values for the same area, different parameters for various available sonar equipment, and threshold values for the various types of targets that may be encountered. These values are placed on different slides and cursors and related thereto in accordance with different values obtained which relate to the water in the operating area. An object of this invention is to determine passive and active sonar ranges of different sonar equipment by use of a hand operated device using obtained information for the different sea parameters or different values taken from charts, etc. Another object is to provide a hand operated device which can determine sonar range of different sonar equipment by use of actual information relating to the water in the area of concern or by obtaining data from developed charts.

DESCRIPTION OF THE DEVICE

Figure 1:
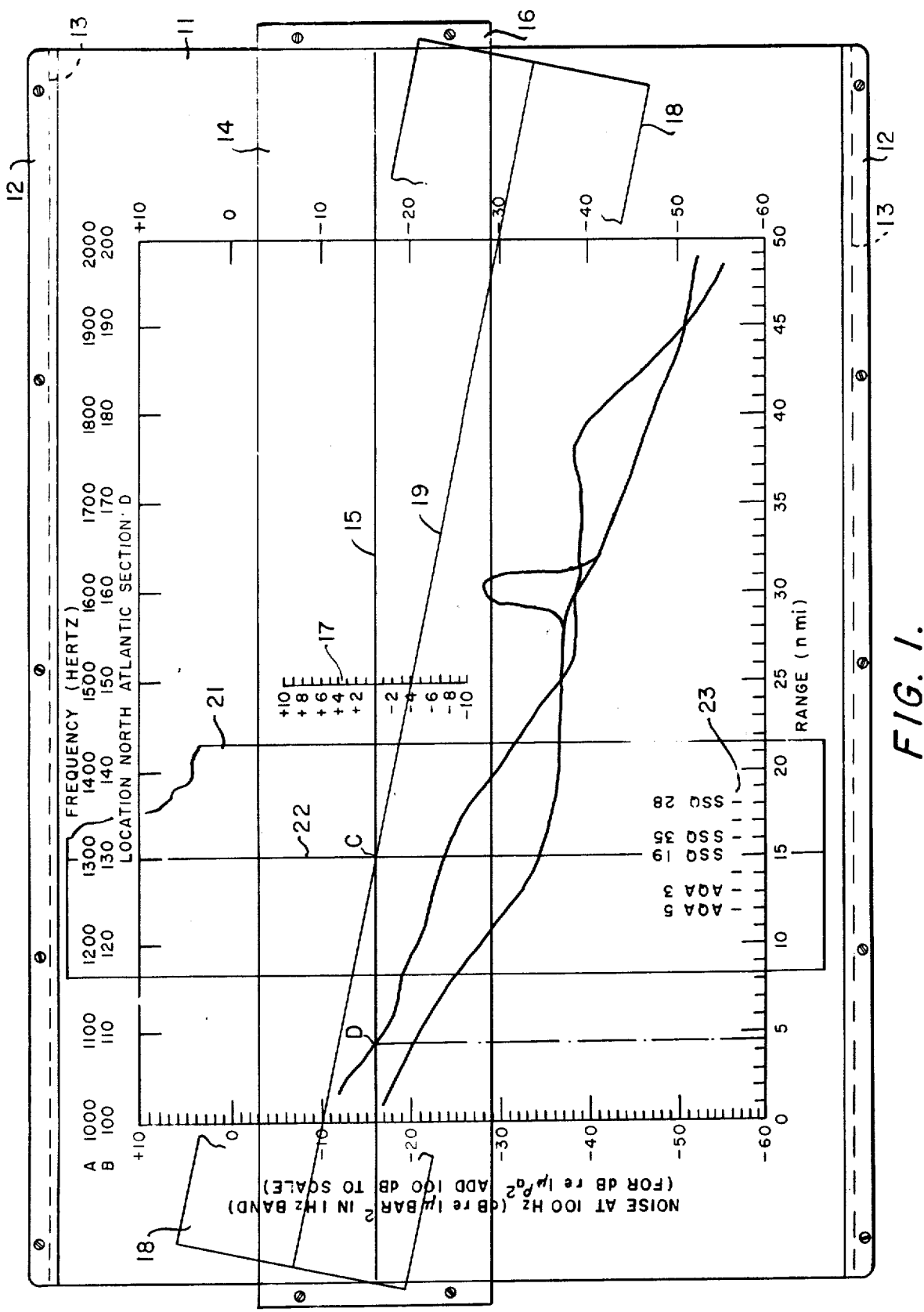
FIG. 1 illustrates a top view of the device showing the relationship of the different elements.

The device includes a base plate 11 made of any rigid material preferably plastic which will not corrode due to the elements. The base may be rectangular and is provided with tracks 12 along opposing edges, top and bottom, which form slots 13 along the surface of the base by which other elements are secured in place relative to the base.

A source level slider 14 formed of a clear plastic or similar material having a hairline 15 along the center of its length is secured onto the base by use of a similar strip on the back side of the base. The two strips are secured together at their ends with a spacer 16 therebetween. The spacer is thicker than the base to permit movement of the slider relative to the base. The source level slider is provided with a frequency correction hairline across its width perpendicular to the hairline across its length through the center thereof. The source level slider is provided with graduations along the source level correction hairline graduated in source level from 0 to +10 and 0 to −10. The graduations are spaced in accordance with published source level values available in current classified literature. These values are used in case of a different target where the source may be greater or less than the reference target. The base, rails, and slider forms an integral unit with which other elements are combined to compute range. An ambient noise decibel cursor 18 which is not secured to the base is made of a transparent material such as plastic. The cursor has a hairline 19 through the center of its length and is used to align different determined noise level values in order to determine range.

In order to determine range for the different types of equipment a target slider 21 that rides under the rails is used. The target slider is shorter in length than that of the base. It is provided with a hairline 22 perpendicular to the rails and graduations 23 are spaced on opposite sides of the hairline and along the bottom for the different types of equipment. The graduations are spaced in accordance with the published equipment sensitivity (recognition differential) values available in the current classified literature.

Figure 6:
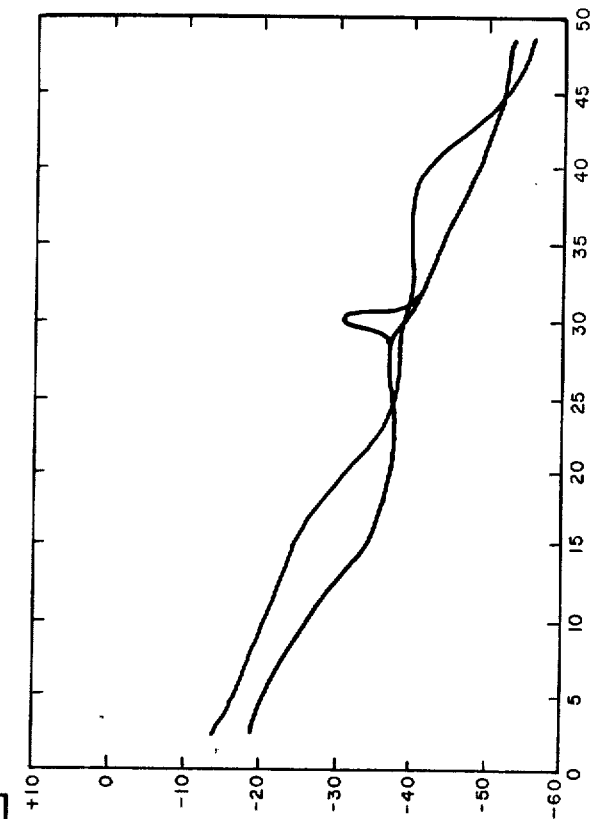
FIG. 6 illustrates a passive propagation loss curve insert.
Figure 5:
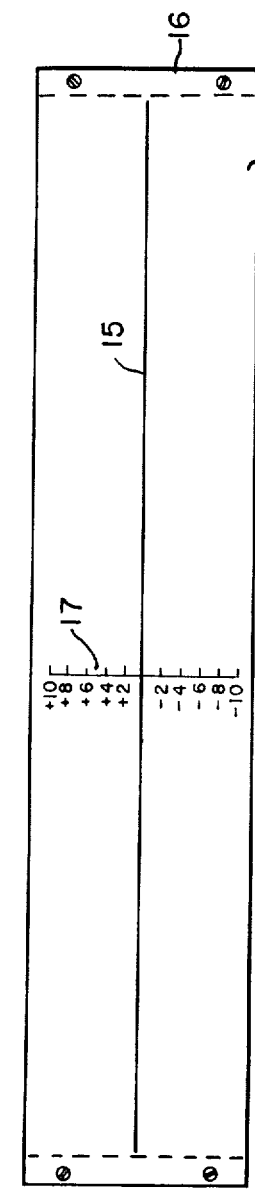
FIG. 5 illustrates a source level slider.
Figure 4:
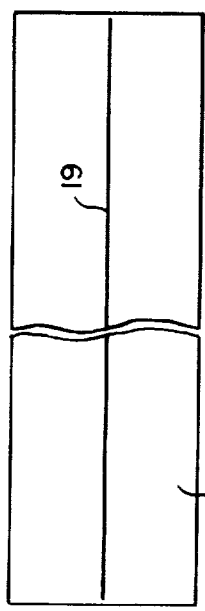
FIG. 4 illustrates an ambient noise decibel cursor.
Figure 2:
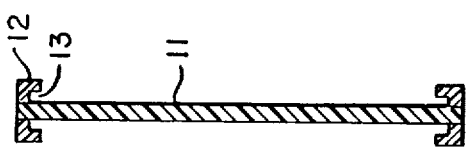
FIG. 2 illustrates a side view.
Figure 3:
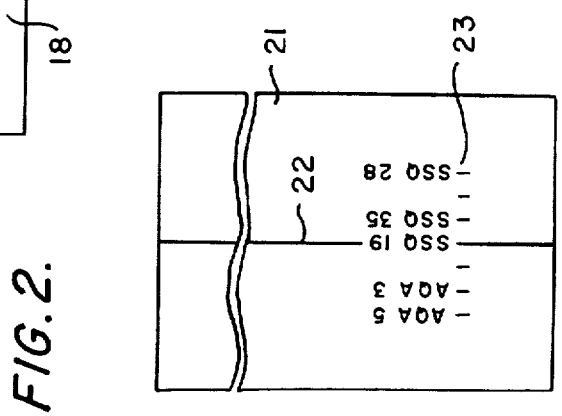
FIG. 3 illustrates the target slider.

There are two different modes of operation passive and active. Therefore, different charts with different propagation loss curves thereon are made up for a particular area or water mass and for particular types of equipment. Several curves may be made on one chart representative of the different areas. FIG. 6 illustrates a chart having propagation loss curves representative of different areas of the North Atlantic. Other charts may be made for other areas and for different bodies of water.

In operation in the passive mode, the device is assembled and ready for use. Obtain a graph corresponding to the appropriate sensor being used and for the water mass of interest. Slide the graph over the base under the rails along the edge of the base and under the source level slider. Read off the ambient noise values from the noise meter instrument; if no meter is available determine the value from the atlas of values for ambient noise values associated with the desired water mass. Enter the ambient noise values on the left and right side of the chart corresponding to the correct frequency. Connect these values with the ambient noise cursor. Using the appropriate propagation loss curves, line up the hairline on the target cursor or slider with the appropriate characteristic dominant frequency observed on the Lofagram. Align the hairline on the horizontal source level slider with the intersection of the hairline on the target cursor and the ambient noise cursor. Correct the values for the source level of the target by moving the horizontal cursor up or down depending on the source level used by using the source level scale located on the horizontal source level slider. Move the target slider over to the intersection of the appropriate propagation loss curve and the horizontal source level hairline and read off the range obtained by noting the intersection of the target slider hairline and the bottom range line. The value noted is the passive range to be expected for one particular sensor depth.

The above operations are carried out for other sensor depth corresponding to other propagation loss curves to determine the optimum sensor depth by selecting the sensor depth which gives the greatest range in the area of interest.

As an example of operation of the above described computer the following is assumed.

1. Operating area North Atlantic, Lat. 79°W, long. 35°N

2. Submarine at snorkel depth, water mass — Sarogasso, source level sensor of 100 db/$\mu$bar emitting dominent frequency line of 92 Hertz.

3. Ambient noise level −10 db ref $\mu$bar at 100 Hertz −30 db ref $\mu$bar at 200 Hertz for passive detection, sonobuoy with transducer capable of detecting at 60 feet or 300 ft., sonar processing equipment is an AN-/AQA-5N with a detection threshold of 3 bd.

Select the appropriate propagation loss curve for the area of interest. Move the target slide 21 with the hairline 22 over the correct frequency of 130 Hertz. Align the ambient noise decibel slider 18 with the hairline 19 over the values of the ambient noise from the actual measured values, given as −10 db at 100 Hertz and −30 db at 200 Hertz. Indicate the point C of intersection between the target slider hairline and the ambient noise cursor hairline. Move the source level slider relative to intersection point C such that the source level hairline is opposite point C. Note point D, the intersection between the hairline on the source level slider and the correct propagation loss curve. Align the hairline 22 of the target slider 21 with the interception D and note the range of 4.0 miles on the range scale at the bottom for a target reference source level of target, noted at the scale at the top.

The sonar range usually needs to be corrected for the detection threshold, therefore, the target slide may be moved to the designated equipment AN/AQA-5 for this correction, give a final reading of 7.3 miles for a hydrophone depth of 90 feet.

Perform the above steps for the same equipment using the same criteria as above, based on a Hydrophone depth of 300 feet and using the appropriate propagation loss curves. This may be done for several different sensor depths corresponding with other propagation loss curves to determine the optimum sensor depth by selecting the sensor depth which gives the greatest range.

For operation in the active mode, the same basic steps as given above are followed. Additionally, reverberation values are used to arrive at an optimum sonar transducer depth.

Obviously many modifications and variations of the present invention are possible in the light of the above teachings. It is therefore to be understood that within the scope of the appended claims the invention may be practiced otherwise than as specifically described.

What is claimed is:

1. A hand operated sonar range computer; which comprises, a base, said base including rails along opposite edges on each side of said base with a spacing between the rail and said base, a frequency slider secured at the edge of said base and movable along the surface of said base in a line perpendicular to said rails, a hairline on the center of said frequency slider extending across the length thereof, a decibel cursor movable across the base for alignment with different values, a target slider secured in place at its edges by said rails for movement along said base by use of said rails, a center line across said target slider perpendicular to said hairline on said frequency slider, graduations on opposite side of said target slider center line representative of different types of sonar equipment, and a propagation loss insert positioned on said base under said target slider and held in place by said rails, whereby said elements cooperate to determine range in accordance with different parameters of the sea relative to the depth of sonar equipment used.

2. A hand operated sonar range computer as claimed in claim 1; wherein, said target slider has graduations on opposite sides of said hairline for more accurate range determination.

3. A hand operated sonar range computer as claimed in claim 2; wherein, said propagation loss insert has a plurality of curves thereon for different masses of water.

* * * * *